No. 614,232. Patented Nov. 15, 1898.
R. M. NORTON.
VELOCIPEDE.
(Application filed Nov. 22, 1897.)
(No Model.)
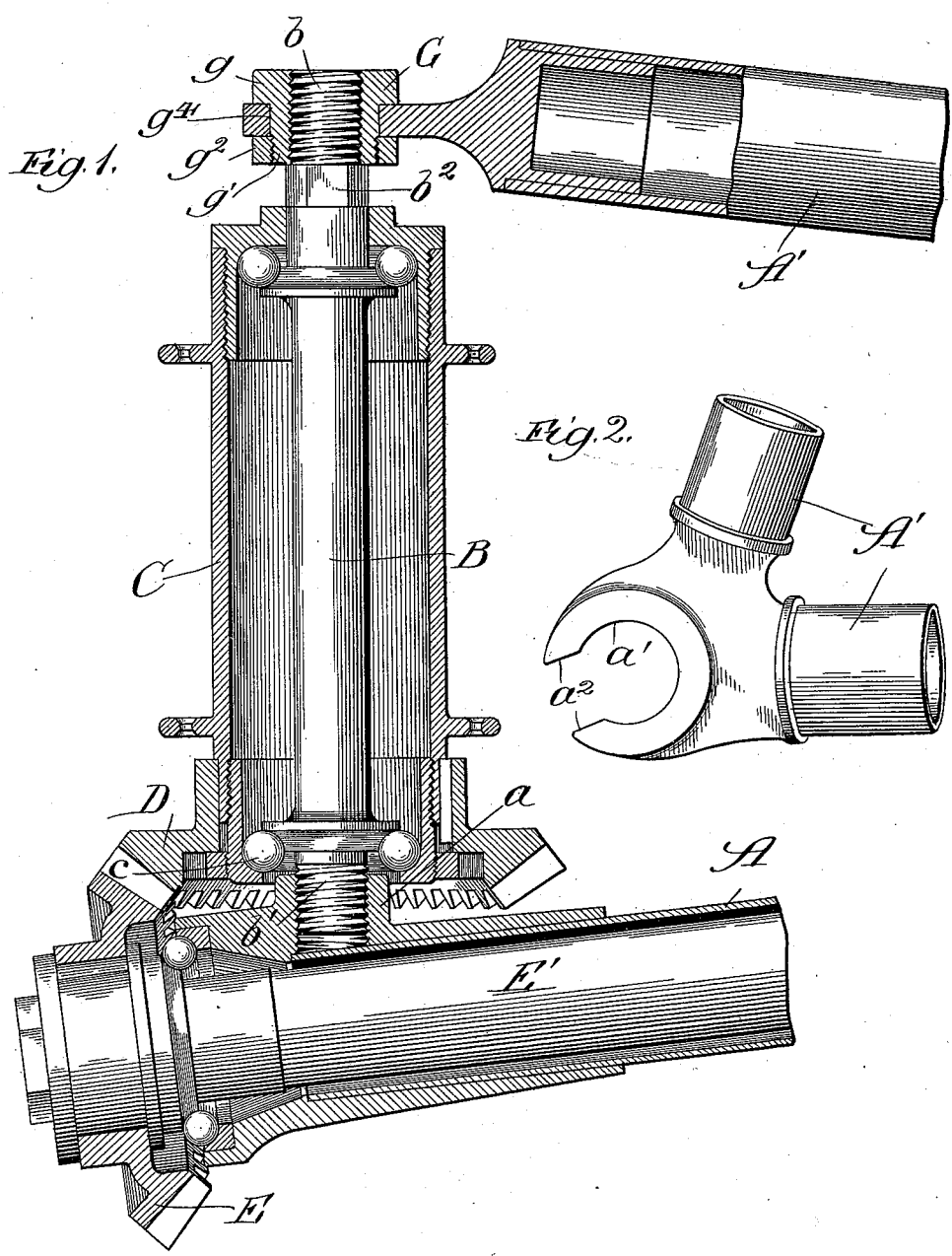

UNITED STATES PATENT OFFICE.

ROBERT M. NORTON, OF KENOSHA, WISCONSIN.

VELOCIPEDE.

SPECIFICATION forming part of Letters Patent No. 614,232, dated November 15, 1898.

Application filed November 22, 1897. Serial No. 659,465. (No model.)

*To all whom it may concern:*

Be it known that I, ROBERT M. NORTON, a citizen of the United States, residing at Kenosha, in the county of Kenosha and State of Wisconsin, have invented certain new and useful Improvements in Velocipedes, of which the following is a specification.

The object of my invention is to provide a safety-bicycle of the rear-driven and chainless type with axle mechanism by which the rear driving-wheel may be readily removed or replaced without disturbing the other parts; and the invention consists in the features, combinations, and details of construction hereinafter described and claimed.

In the accompanying drawings, Figure 1 is a plan sectional view of the rear end of a bicycle, showing a portion of the lower-rear-fork members, hub of the rear driving-wheel, axle, and other mechanism; and Fig. 2, a perspective view of one end of the lower rear fork.

In the art to which this invention relates, and particularly in connection with safety-bicycles of the rear-driven type, which are fitted with bevel-gear mechanism for the purpose of transmitting power and motion from the crank-shaft to the rear driving-wheel, it is very difficult to insert or remove the rear driving-wheel from its position in the rear fork without disturbing other mechanisms. The reason of this is that in some of these instances the intermediate bevel-gear is to the rear of the axle, in the direction in which the axle must be moved, and as a consequence the axle must first be given a longitudinal movement or motion, so as to withdraw the beveled gear on the rear driving-wheel from engagement with the intermediate beveled gear. As ordinarily constructed the frame does not permit of this longitudinal movement.

The principal object of my invention, therefore, is to provide a safety-bicycle of the type above described with an axle that may be first moved longitudinally and then laterally to withdraw the rear driving-wheel from engagement with the bicycle-frame.

In illustrating and describing my improvements I have illustrated and described only those portions which I consider to be new, taken in connection with so much as is old to properly disclose the invention and enable those skilled in the art to practice the same. I have not thought it necessary to illustrate or describe other well-known mechanisms which go to make up a complete bicycle, as such description might tend to confusion, prolixity, or ambiguity.

In constructing a bicycle of the class described and fitting it with my improvements I use a frame portion of the desired size, shape, and strength, the lower-rear-fork members A and A' being shown in the accompanying drawings. One of these members (preferably the member A) is provided with a boss $a$, having one end of the axle B in threaded engagement therewith. The usual driving-wheel hub C is mounted on the axle by means of antifriction-bearings $b$ and has a bevel gear D at one end thereof, engaging with a bevel-gear E on a horizontal intermediate driving-shaft E'.

It will be seen from an inspection of the drawings that the intermediate bevel-gear E is to the rear of the axle, so that the axle cannot be moved laterally into its engagement with or disengagement from the intermediate beveled gear. The axle must therefore be first moved longitudinally, and in order to accomplish this I make a fork member A' in such manner as to provide a lateral opening having a circular enlarged portion $a'$ and a narrow opening $a^2$ connected therewith, through which the axle is inserted. The free end of the axle is screw-threaded at $b$, and its diameter is slightly smaller than the diameter of the narrow portion of the lateral opening $a^2$ in the fork member. Engaging with this threaded portion of the axle and adapted to fill the enlargement of the lateral frame-opening is a threaded sleeve G, having a shoulder portion $g$ and an inner threaded projecting portion $g'$, the inner threaded projecting portion having a lock-nut $g^2$ thereon to locate the parts in the position shown in the drawings. This threaded sleeve prevents the axle from having lateral movements and when locked prevents its moving either laterally or longitudinally.

When it is desired to assemble the parts, the rear driving-wheel is placed in engagement with the axle. The wheel is then inserted in between the fork by slipping the wheel into place in such manner that the free threaded end $b$ of the axle may pass in the lateral opening of the lower-fork member, leaving the opposite threaded end $b'$ in line with the threaded opening of the fork member. By turning the axle, using a wrench on the hexagonal portion $b^2$, the axle is brought into engagement with the threaded opening of the fork member, so as to obtain the desired engagement between the intermeshing beveled gears. As soon as the desired engagement has been obtained the threaded sleeve G is brought into threaded engagement with the threaded free end of the axle and acts to hold it against lateral displacement, and as the lock-nut $g^2$ has first been placed on the axle before its insertion in the frame it is now brought into engagement with the threaded sleeve and acts to firmly lock or clamp the same on the fork member and thereby to hold the parts in position and against all movement. As the diameter $g^1$ of the threaded sleeve is larger than the diameter of the lateral opening $a^2$—that is, just large enough to fill the lateral opening $a'$ in the fork member—it will be seen that it is impossible to withdraw any of the parts until the lock-nut $g^2$ has first been removed and the sleeve unscrewed from engagement with the axle. It will also be seen from the foregoing description of construction and arrangement of parts that the removal of the axle may be obtained by removing the lock-nut and threaded sleeve and then unscrewing the axle so as to move it longitudinally and free it from engagement with the fork member. This will enable the wheel to be withdrawn from its position in the frame without disturbing other mechanisms.

I claim—

1. In a bicycle of the class described, the combination of an axle upon which the driving-wheel is rotatably mounted and having threaded engagement with the frame portion, a frame portion provided with a threaded opening to engage one threaded end of the axle and a second lateral perforation having an entrance or passage of smaller diameter through which the other end of the axle may be laterally inserted or removed, and means arranged to fill such perforation and hold the other end of the axle in position and positively against lateral displacement, substantially as described.

2. In a bicycle of the class described, the combination of an axle upon which the driving-wheel is rotatably mounted screw-threaded at both ends and having one end in threaded engagement with the frame, a frame portion provided with a threaded opening to receive one end of the axle and a second lateral perforation having an entrance or passage of smaller diameter through which the other end of the axle may be laterally inserted or removed, and lock-nut mechanism engaging the other threaded end of the axle arranged to fill the perforation and hold the axle in position and positively against lateral displacement, substantially as described.

3. In a bicycle of the class described, the combination of an axle upon which the driving-wheel is mounted and screw-threaded at or near both ends, a frame portion having a threaded opening to engage one end of the axle and a lateral opening at the opposite side to receive the free end of the axle adapted to be engaged with the axle, a threaded sleeve engaging the free threaded end of the axle and inserted in the enlarged portion of the lateral opening of the frame member to prevent lateral displacement of the axle, and means to prevent longitudinal movement of the sleeve and thereby the axle and hold them in engagement with the frame, substantially as described.

ROBERT M. NORTON.

Witnesses:
JOHN C. SLATER,
FRANCIS A. KERSHAW.